United States Patent [19]

Weiblen

[11] Patent Number: 4,869,627
[45] Date of Patent: Sep. 26, 1989

[54] GUIDE DEVICE FOR A DEEP DRILLING TOOL

[75] Inventor: Richard Weiblen, Münsingen-Dottingen, Fed. Rep. of Germany

[73] Assignee: TBT Tiefbohrtechnik GmbH & Co. KG, Dettingen, Fed. Rep. of Germany

[21] Appl. No.: 163,832

[22] Filed: Mar. 3, 1988

[30] Foreign Application Priority Data

Mar. 5, 1987 [DE] Fed. Rep. of Germany ....... 3707022

[51] Int. Cl.$^4$ .............................................. B23B 41/02
[52] U.S. Cl. ................... 408/234; 428/241 R; 428/705
[58] Field of Search ............... 408/77, 97, 110, 115 R, 408/234, 241 R, 241 G, 241 B, 705, 53, 57, 59

[56] References Cited

U.S. PATENT DOCUMENTS 3,361,014  1/1968  McClennan .................... 408/705
4,726,717  2/1988  Schmid ........................ 408/705

FOREIGN PATENT DOCUMENTS

3338239  9/1986  Fed. Rep. of Germany .
  13192  2/1977  Japan ......................... 408/234
   4504  1/1987  Japan ........................ 408/241 R
 529044  2/1977  U.S.S.R. ..................... 408/705
1122445 11/1984  U.S.S.R. ..................... 408/241 R
1240519  6/1986  U.S.S.R. ..................... 408/241 G

*Primary Examiner*—Gil Weidenfeld
*Assistant Examiner*—Daniel W. Howell
*Attorney, Agent, or Firm*—Jones, Tullar & Cooper

[57] ABSTRACT

A guide device for a deep drilling tool of a deep drilling machine including at least one guide jaw having a guide surface for guiding the elongated shaft of the drilling tool. The guide jaw has an outer surface which extends in a circumferential direction. The outer surface has a groove defined by a semicircularly shaped surface. The groove extends along at least a part of the circumferential extent of the outer surface. The semicircularly shaped surface has a diameter which varies along the circumferential extent of the outer surface. The surface so configured serves as the guide surface.

15 Claims, 12 Drawing Sheets

GUIDE DEVICE FOR A DEEP DRILLING TOOL

FIELD OF THE INVENTION

The present invention relates to a guide device for a deep drilling tool in a deep drilling machine having a guide surface surrounding at least a part of the shaft of the deep drilling tool.

BACKGROUND OF THE INVENTION

A deep drilling tool generally has a relatively long shaft or tube which, at least during the start of drilling, as well as during drilling must be guidingly directed in order to avoid oscillation of the tool and/or jumping out of the tool from the drill hole. In known guide devices of the previously mentioned type, so-called collar plate are used for this purpose. They are disposed between the head spindle box and the workpiece. They are in general formed by a sleeve in which the shaft or tube is guided during drilling. For inserting the shaft or tube of a deep drilling tool, the sleeve and its mounting are usually made in two parts and hinged for opening.

The disadvantage of such an arrangement lies in that the length of the collar plate including the length of the carriage on which it is disposed, must be accommodated on the deep drilling tool in addition to the length of the hole to be drilled. With a specified length of the drill hole this increases the structural length of the entire deep drilling machine as well as the length of the required deep drilling tool. Furthermore, the assembly or disassembly of the collar plate in order to insert or remove the shaft is cumbersome and is not suitable for automatic changes of the tool. A further disadvantage is that collar plates with different sleeve diameters must be provided for inserting deep drilling tools with different shaft diameters.

SUMMARY OF THE INVENTION

It is an object of the present invention to provide a guide device of the type mentioned previously such that it becomes possible to use deep drilling tool shafts of different diameters in as simple a manner as possible. The guide device should also be suitable for use in a CNC-controlled machine tool. Furthermore, the need for an additional length of the deep drilling tool and the deep drilling machine is to be avoided, if possible, as a result of the guide device.

This object is attained by forming the guide device by means of at least one pivotable guide jaw, the pivot axis of which is disposed vertically to the longitudinal extension of the deep drilling tool. The outer surface of the guide jaw having a groove with a semicircular diameter extending along at least a part of its circumference in the circumferential direction. The diameter of the semicircle changing in the circumferential direction and forming a guide surface, having a semicircular diameter which is dependent on the pivoted position of the guide jaw, for the shaft of the deep drilling tool tangentially abutting the semicircular surface of the groove.

The result is that by a simple pivoting of the guide jaws the guide surface can be adapted to different diameters of the shaft. Pivoting of the guide jaw can be adapted in a particularly simply manner (for example by means of control with a step motor or the like) to the requirements of an automatically controlled (CNC-controlled) machine tool.

According to an advantageous embodiment of the present invention the guide device is formed by two guide jaws, the outer surfaces of which abut each other at one point. Each of the outer surfaces has a groove, which together form at the location where the outer surfaces abut, a guide opening with a diameter which is different depending on the pivot position of the guide jaws.

In this way, the shaft is completely enveloped so that guidance is further improved. According to this embodiment of the present invention, too, the unit formed by the different pivot positions of the guide jaws to each other is adaptable to different diameters of the shaft of the deep drilling tool.

In accordance with a further advantageous embodiment, it is provided that the outer surfaces of the guide jaws together have, in a certain pivot position, a further opening extending in the direction of the deep drilling tool and coaxial with it, through which the clamping cylinder containing the deep drilling tool can extend. In this manner, the full length of the deep drilling tool can be used in the last drilling phase without the carrier, disposed between the drill sleeve support and the spindle of the deep drilling machine and supporting the guide device practically preventing the full meeting between the clamping cylinder and the tool.

In case of particularly difficult guide situations in connection with a deep drilling machine, such as with particularly long deep drilling tools, two units formed by two guide jaws each are advantageously disposed behind each other.

A further advantageous embodiment of the present invention provides that the outer surface of the guide jaws together have, in a further specified pivot position, a recess open on top and closed at the bottom by baffle and damper plates, to accept the drill head of the deep drilling tool. In this position, the deep drilling tool can be inserted during automatic tool changes, the impact of the drill head on the baffle and damper plates preventing oscillation and thus damage to the drill head.

Suitable control means are provided for the two guide jaws so that the two guide jaws are pivoted in synchronization with each other such that the semicircular diameters of the grooves in the outer surface to be associated with each other are actually in the position where the outer surfaces of the guide jaws abut. For this purpose, it can be provided that both guide jaws are each equipped with a toothed wheel, the two toothed wheels being in engagement with each other and at least one of them being coupled with a servo motor.

Furthermore, it is advantageously provided to make the guide jaws of a plastic material having bearing properties, preferably of polyoxymethylene. A further advantageous embodiment of the present invention provides that both guide jaws are pivotable via a common control element which can be in the form of either a shaft with two worm drives, a toothed rack or a level bar.

However, it is also possible in the case of a two-spindled or multi-spindled deep drilling machine to dispose units, formed by two guide jaws each, side by side on a plate.

A further advantageous embodiment of the present invention provides that a guide unit is formed by two guide jaws which are disposed in a vertical plane and each on a shaft, one shaft being pivotable out of the operating position for a manual tool change.

An advantageous method for the operation of a guide unit formed by two interacting guide jaws is characterized in that a specified adjustable torque acts in that pivot direction, which results in a reduction of the diameter of the guide opening, on both guide jaws when, the shaft of a deep drilling tool is installed, and produces a specific friction between shaft and guide surface which is usable for preventing torsional oscillations of the deep drilling tool.

The invention is usable in connection with any deep drilling operation, BTA operation, single lip drill operation, ejector operation, as well as with extra-long spiral drills, drilling rods or the like.

Exemplary embodiments of the present invention and their advantageous improvement are described below in detail by means of the drawings.

DETAILED DESCRIPTION OF THE PREFERRED EMBODIMENTS

Figure 1:
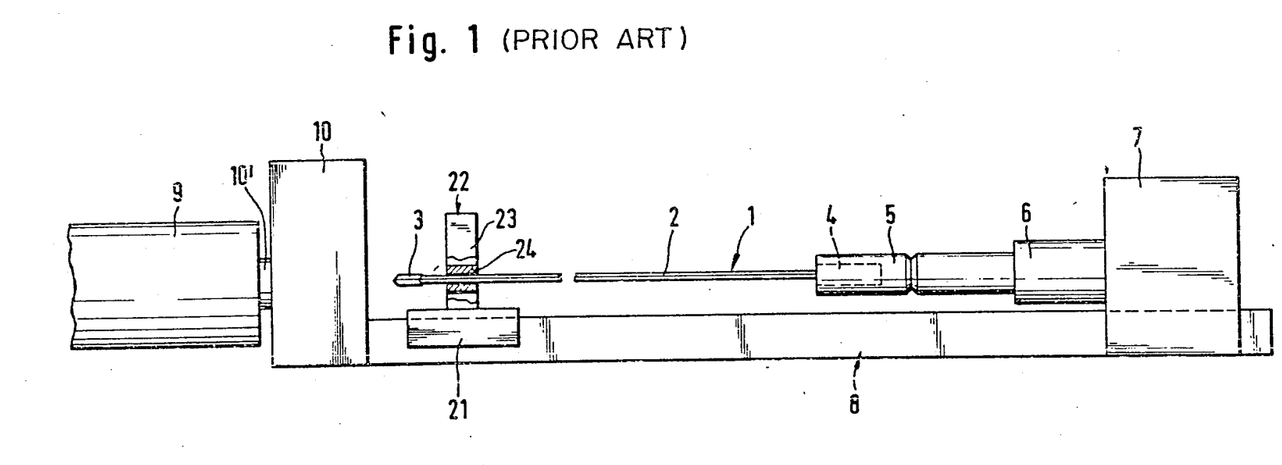
FIG. 1 schematically illustrates a prior art deep drilling machine with a deep drilling tool and guide device.

FIG. 1 illustrates a known deep drilling machine, a so-called "single lip deep drilling tool". Other deep drilling methods and machines can also be used. The deep drilling tool 1 comprises a shaft 2, V-shaped in cross section and provided with an interior channel, having a drilling head 3 at one end and a cylindrical clamping shaft 4 at the other end. The clamping shaft 4 is contained in a clamping cylinder 5 which in turn is contained in a head spindle 6. This head spindle 6 is provided in a head spindle box 7 and is driven by a motor (not shown). The head spindle box 7 with the head spindle 6 is movable on a machine support 8 in the form of corresponding guide rails, such that the deep drilling tool 1 can be moved in the direction of the workpiece 9. The workpiece 9 is clamped or supported on a support surface (not shown). A drill sleeve support (or in connection with BTA methods the drilling oil supply device) 10 is provided along with a tapping sleeve 10'.

In order to guide or support the shaft 2, a guide device, a so-called collar plate 22, is provided on a carrier 21. The collar plate included a sleeve 24, fitted or placed around a support 23, the inner diameter of which corresponds to the diameter of the cylindrical part of the shaft 2 such that the latter can turn inside of or with the sleeve 24 and thus is exactly guided.

A previously mentioned difficulty lies in the fact that the unit formed by the head spindle 6, head spindle box 7 and deep drilling tool 1 can only be moved towards the left in the direction of the workpiece 9 until the clamping cylinder 5 engages the right side of the collar plate 22. The length of the deep drilling tool 1 beyond this remains unused. A further difficulty lies in that during a tool change the collar plate 22 must first be correspondingly disassembled. These collar plates are, for example, in the form of two semicircular segments connected to each other on one side by a joint, one of which can be flipped up after a securing screw has been loosened, However, this process is unsuitable for automation. It is furthermore required to insert a separate sleeve 24 for different diameter shafts. When the deep drilling tool 1 is brought into the position illustrated in FIG. 1 by means of a gripper of an automatic tool changing device, the end of the deep drilling tool 1 may swing and may be damaged during insertion into the upwardly open guide.

Figure 2:
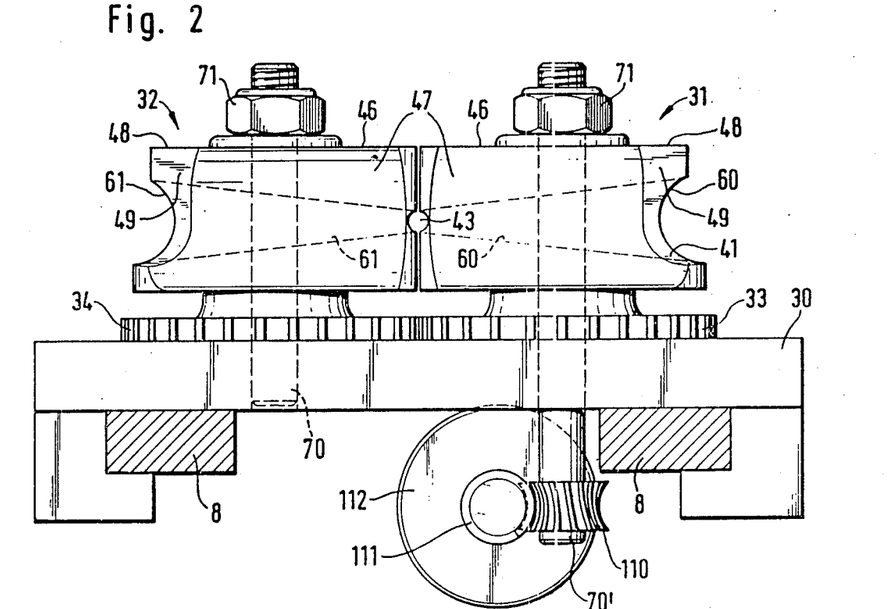
FIG. 2 is a front view of a guide device in accordance with an exemplary embodiment of the present invention.
Figure 3:
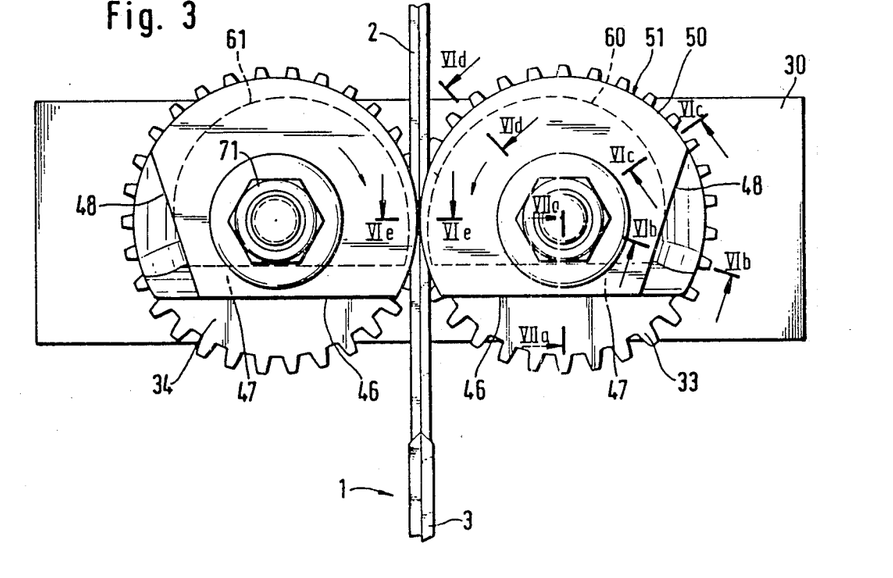
FIG. 3 is a top view of the guide device of FIG. 2.
Figure 7A:
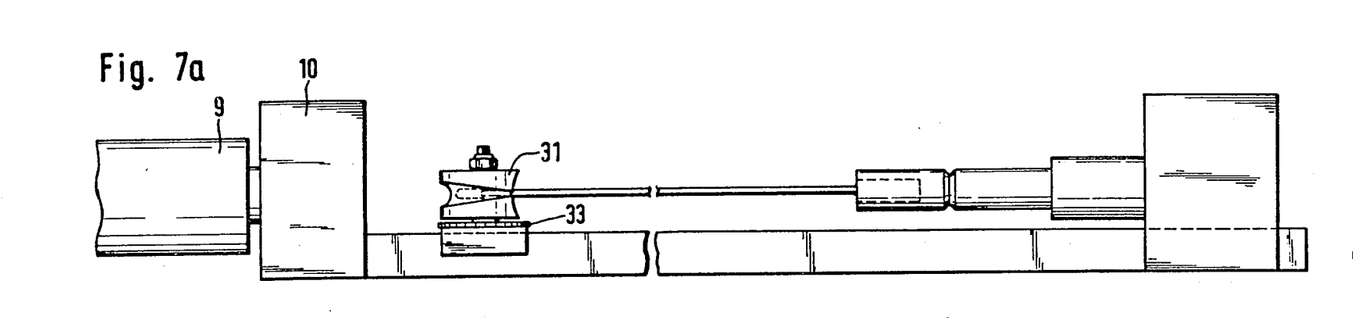
FIGS. 7a to 7c are different positions of a deep drilling machine with the guide device for the deep drilling tool in accordance with FIGS. 4a to 4c, 5a to 5c and 6a to 6c.
Figure 7B:
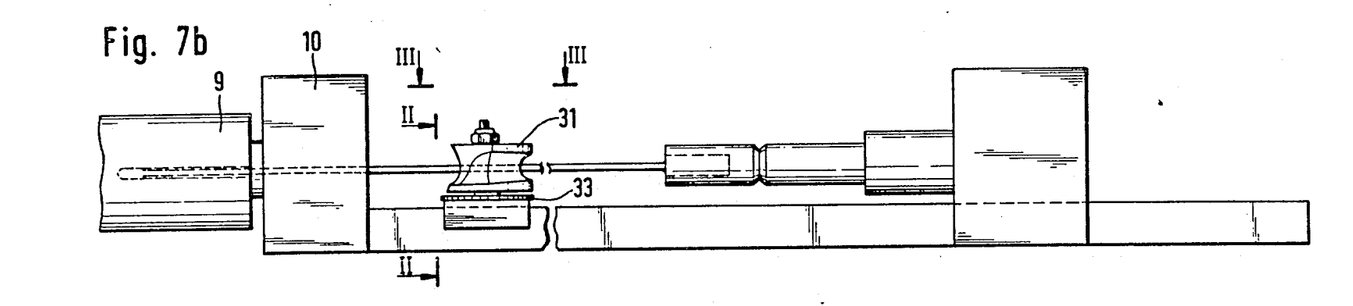

FIG. 2 and FIG. 3 show an exemplary embodiment of a guide device for a deep drilling tool in accordance with the invention in accordance with views II—II and III—III of FIG. 7b. This guide device does not have the disadvantages mentioned above.

The guide device shown in FIGS. 2 and 3 is formed by a base plate 30 on which two guide jaws 31 and 32 are pivotably disposed. Two toothed wheels 33 and 34 are fixedly connected with the two guide jaws and are in engagement with each other so that a turn of the one toothed wheel and the guide jaw associated with it always results in a turn of the other toothed wheel with its associated guide jaw in a counter-clockwise direction (see the arrows in FIG. 3). In this way, it is assured that a defined pivot position of the insertion jaw always corresponds to an exactly defined pivot position of the other guide jaw. Driving of the guide jaw 31, 32 is accomplished by means of a step motor (not shown) acting on one of the toothed wheels 33, 34 which is controlled by the CNC-control of the deep drilling machine.

Figure 4A:
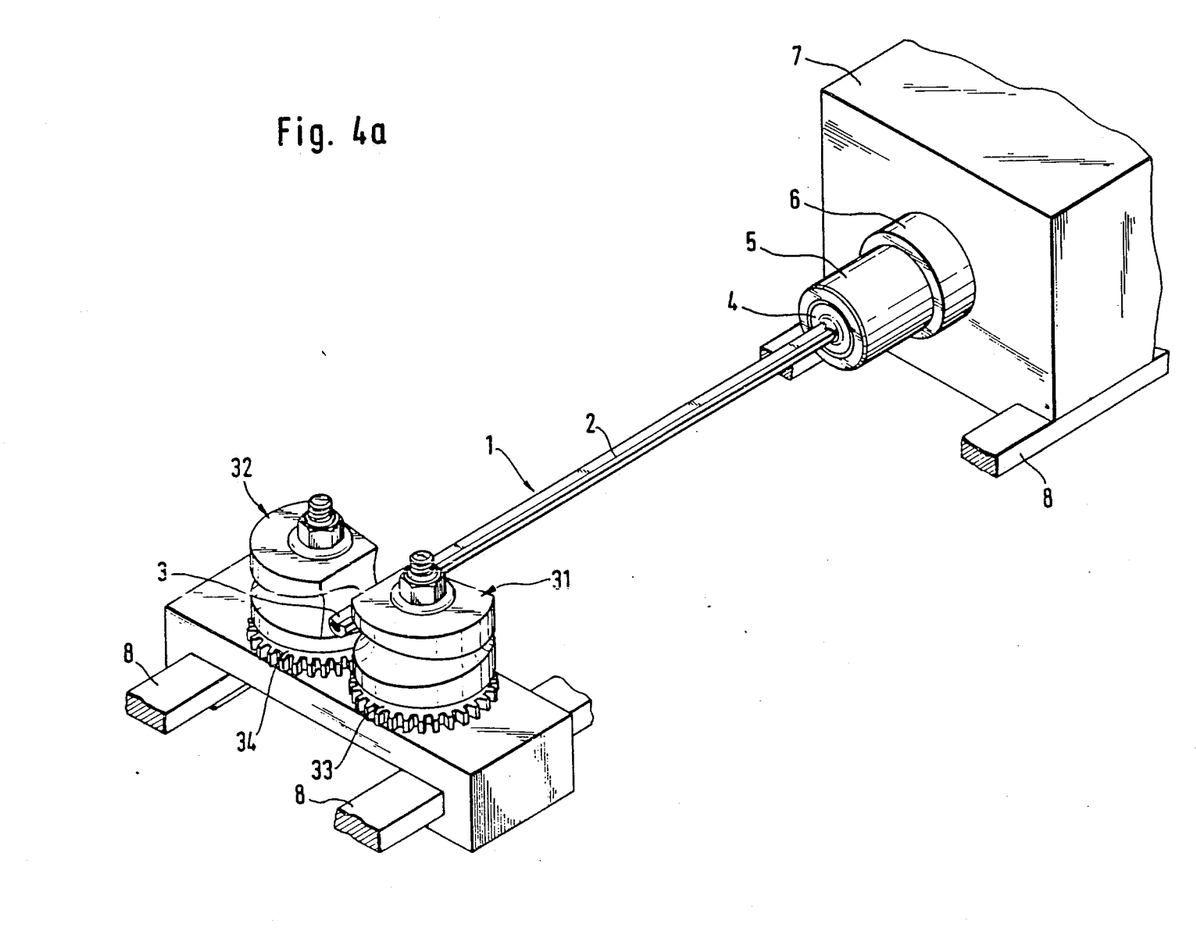
FIG. 4a to 4c are different operational positions of the guide device in accordance with FIGS. 2 and 3.
Figure 4B:
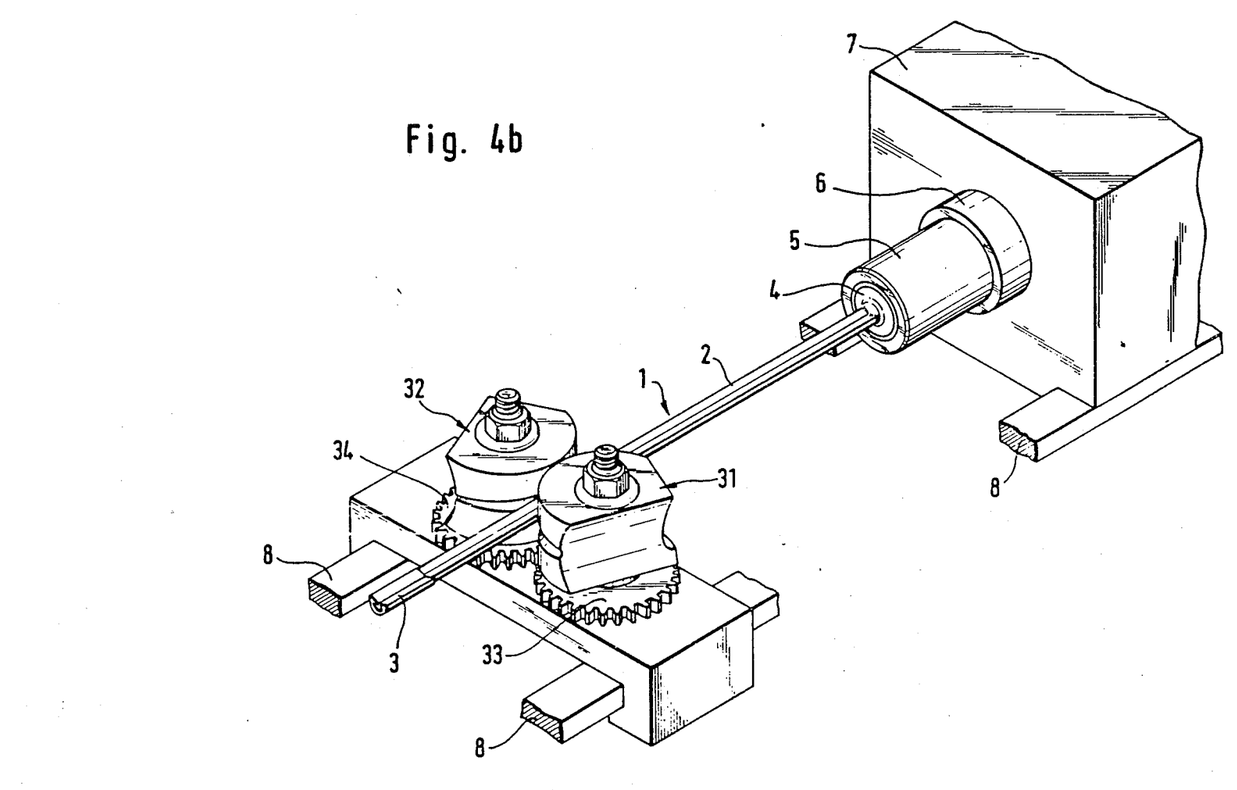
Figure 5A:
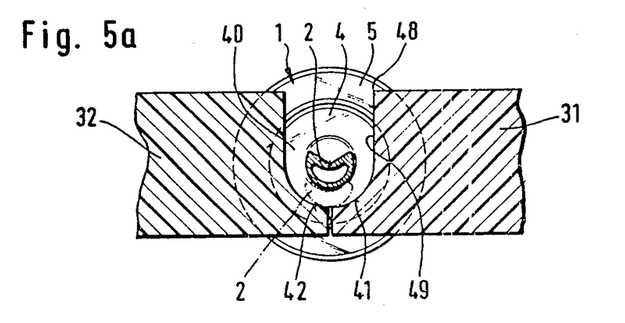
FIGS. 5a, 5b, 5c are sections through adjoining guide jaws in the positions according to FIGS. 4a, 4b, 4c.
Figure 6A:
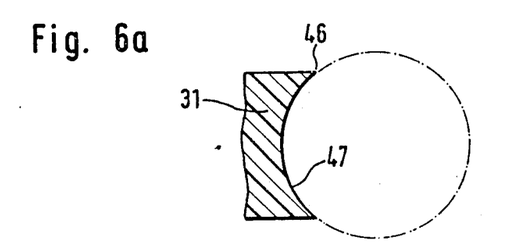
FIGS. 6a to 6e are cross sections along the lines VIIa—VIIa, VIb—VIb, VIc—VIc, VId—VId and VIe—VIe in FIG. 3.
Figure 6B:
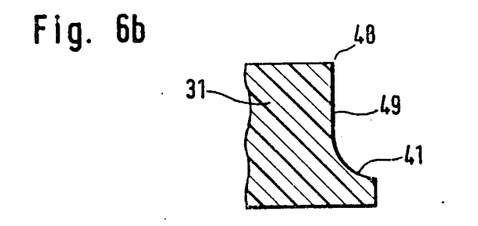

Before describing in more detail the geometry of the guide jaws, a brief discussion of the different functions shown in FIGS. 4a to 4b should be made, because the associated geometry of the guide jaws becomes clear on the basis of these functions:

FIG. 4a (also see FIGS. 5a and 6a) illustrates a first defined pivot position for inserting the deep drilling tool 1 between the two guide jaws 31 and 32. A recess 40 (FIG. 5a), U-shaped in cross section and open towards the top, the lower area of which is formed by damper or baffle segments 41, 42, the cross section of which is in the form of a quarter circle is provided. Insertion is performed by an automatic tool changing device, for example in accordance with German Patent DE PS 33 38 239.

Figure 5B:
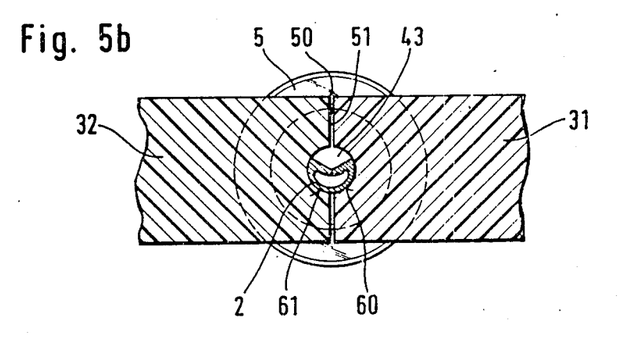

After insertion of the deep drilling tool 1 in accordance with FIG. 4a, the guide jaws are turned and the deep drilling tool 1 is moved in the direction towards the workpiece 9 in such a way that the situation shown in FIGS. 4b, 5b, 7b results, in which the shaft 2 is located between the two guide jaws 31 and 32 in a circular guide opening 43 adapted to the diameter of the shaft. In this position, the guide device serves as a support or "back rest", to prevent jumping out or oscillation of the shaft 2. In order to satisfactorily achieve this result, the plastic materials from which the guide jaws 31, 32 are made are selected to have the corresponding lubricating and running properties, for example, a polyoxymethylene having satisfactory mechanical, heat and chemical stability. Such a material for use as a bearing is available under the trademark "DELRIN".

Figure 4C:
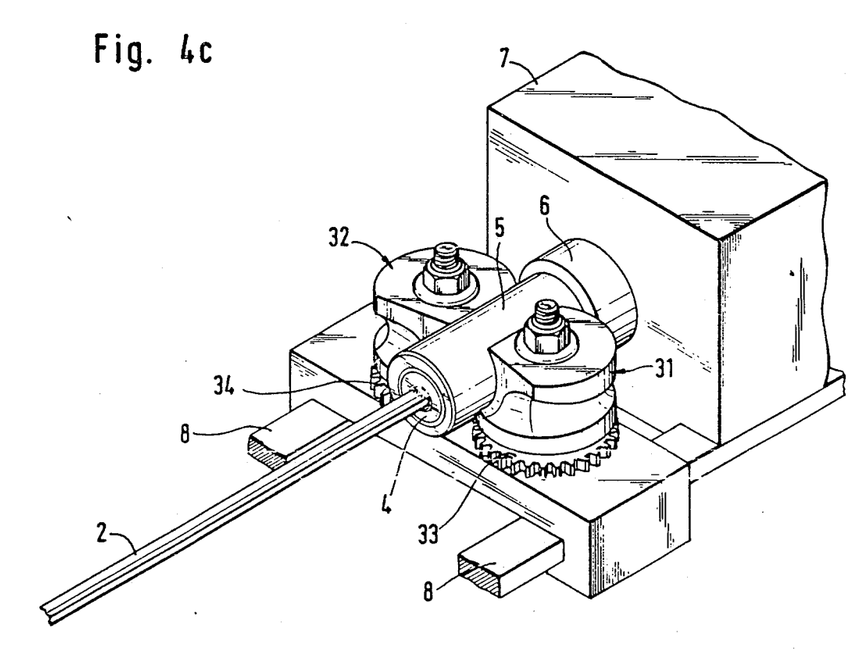
Figure 5C:
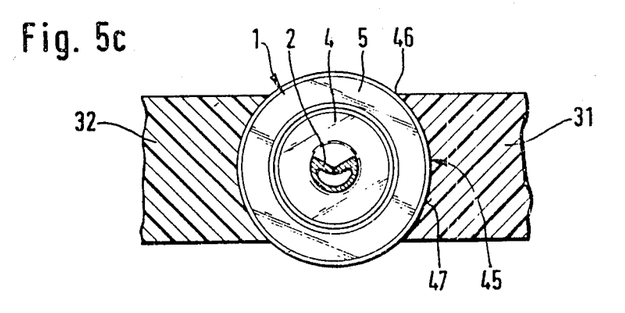
Figure 7C:
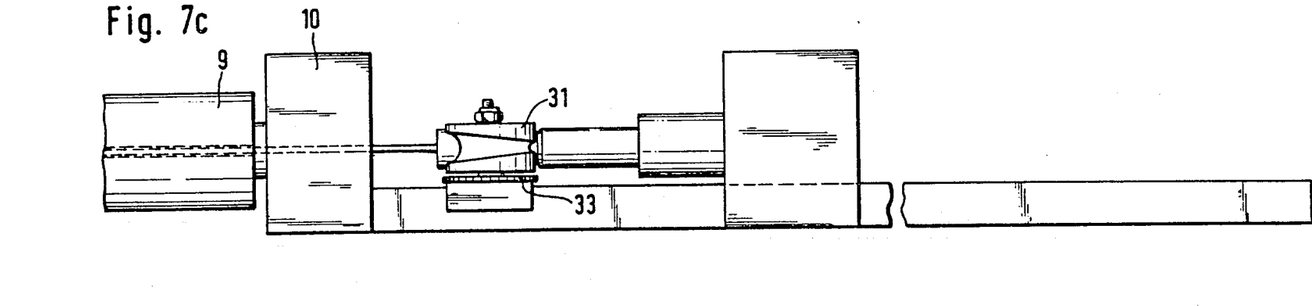

Once the drilling has progressed to the point where the clamping cylinder 5 would contact a collar plate 22, the two guide jaws 31 and 32 are again turned so that they assume a position towards each other as shown in FIGS. 4c, 5c and 7c. Together in this position, they define a further circular guide opening 45 which is sufficiently large to freely "pass" the clamping cylinder 5. Thus, the guide opening 45 has a cross section at least large enough to permit the clamping cylinder to pass through. Then the clamping cylinder is guided in the guide opening 45. However, the guide opening 45 may also be larger.

So that the guide jaws 31 and 32 perform the functions described by means of FIGS. 4, 5 and 6, they are shaped as shown in detail in FIG. 6. FIGS. 6a to 6e show different profiles of the outer surfaces 51 of the guide jaws 31, 32. These outer surfaces 51 are cylindrical at least along a part of the periphery of the guide jaws.

The guide jaw 31 has on its surface (see FIG. 3) firstly a straight edge 46, with a plane 47, circular in cross section, arching downwardly from this edge. Together with the plane 47 of the other guide jaw, it constitutes the partially circular guide opening 45 for the clamping cylinder 5. In the top view according to FIG. 3, a straight edge 48 also follows the edge 46. Starting from it, there is first provided a vertical cut along a straight plane 49 which turns into the damper or baffle portion 41 in the shape of a quarter circle. Following the edge 48 (in the top view) is a circular edge 50 from which the cylindrical outer surface 51 extends. Into this circular outer surface of the guide jaw 31, a circularly extending groove 60 (or 61) has been cut, which is semicircular in cross section. If the guide jaws 31, 32 contact each other at a point (FIG. 3), the semicircular grooves 60 and 61 of the guide jaws 31 and 32 supplement each other and result in a guide opening 43 (FIG. 2) with a circular cross section. The guide opening 43 is formed in the pivot positions in which the grooves 60, 61 are opposite each other and are joined. It encloses the shaft 2.

Figure 6C:
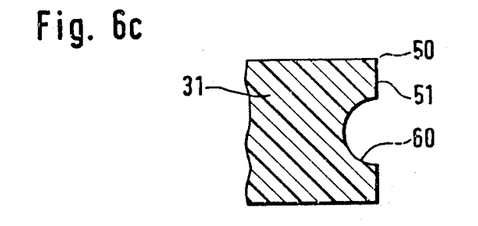
Figure 6D:
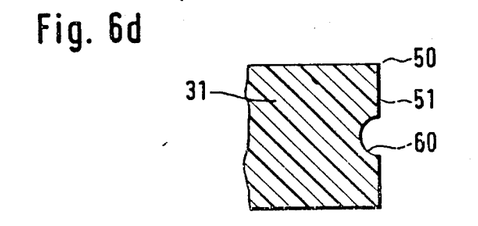
Figure 6E:
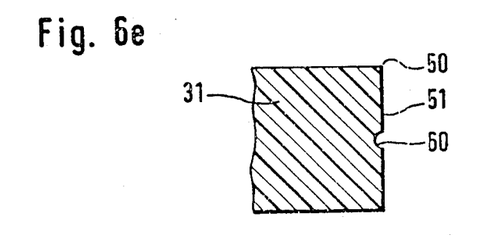

The cross sectionally semicircular grooves 60, 61 circling the cylindrical outer surfaces 51 of the guide jaws 31, 32 change their diameters along the periphery, best seen in a comparison of FIGS. 6c, 6d, 6e, as well as their position in FIG. 3. Depending on the pivot position of the guide jaws 31 and 32 with respect to each other, a guide opening 43 with differing diameters results. Thus, the diameter of the guide opening 43 can be adjusted to different shaft diameters of a shaft 2 of a deep drilling tool 1 by rotating or pivoting of the guide jaws. In general, the size of the diameter of the guide opening 43 is preset as a control size. The guide jaws 31, 32 are rotated until the diameter has been attained. It is also possible to pivot the guide jaws with a preset torque until they abut against the shaft 2 with a defined force. The friction created can be used to damp the torsion oscillations, in particular with a round shaft of the type used with the so-called BTA method or with the ejector method. Damping can then be effected by the torque acting on the guide jaws, this even during the drilling process. This makes possible optimization during operation.

In summary: the cylindrical outer surfaces 51 of the guide jaws 31, 32 have in the peripheral direction grooves 60, 61 with a semicircular cross section which changes in the peripheral direction. In rotated or pivoted positions where the grooves adjoin, guide openings 43 result. In a first defined pivot position, a second guide opening 45 for the clamping cylinder 5 between each guide jaw is the result of a cut (straight edge 46, plane 47) in each guide jaw. Because of a further cut (straight edge 48, planes 49, surfaces 41, 42) of each guide surface in a second pivot position, a recess 40 open toward the top is created between them. The planes merge into each other. The recess 40 is at an angle of a little more than 90° to the main direction of the guide opening 45 (see edges 46, 48 in FIG. 3). The cylindrical outer surface 51 takes up approximately half the circumference.

In FIG. 5a the two guide jaws 31 and 32 are positioned with respect to each other thus that their edges 48 or their surfaces 49 are located opposite and parallel to each other (see also FIG. 4a). This is the position in which the deep drilling tool 1 can be inserted in such a way that the drill head 3 can swing into the recess 40, which is U-shaped in cross section.

FIG. 7b illustrates one of a number of possible pivot positions in which the semicurcular grooves 60, 61 abut and are opposite each other and thus complement each other to form the guide opening 45, which is circular in cross section and the diameter of which depends on the pivot position. In this position, the shaft 2 is guided in the guide opening 43. See also FIGS. 4b and 5b.

In FIG. 7c, the circularly arched surfaces 47 are opposite each other so that the clamping cylinder 5 is inserted and guided between them. Also see FIGS. 4c and 5c.

The cooperation of the base plate 30 with the guidance of the machine support 8 is seen in FIG. 2. This is known, and therefore, does not require further explanation. In principle, the guidance is the same as the guidance of the known collar plate 22 on a carriage guide. It can be further seen in FIG. 2 that the guide jaws 31 and 32 are mounted on pins 70 and 70′, formed in one piece with the toothed wheels 33, 34 and provided on their upper ends with a thread on which nuts 71 are screwed. The pin 70′ is connected via a toothed wheel 110 and pinion 111 with a servo motor 112 which is flanged on the plate 30.

Figure 8A:
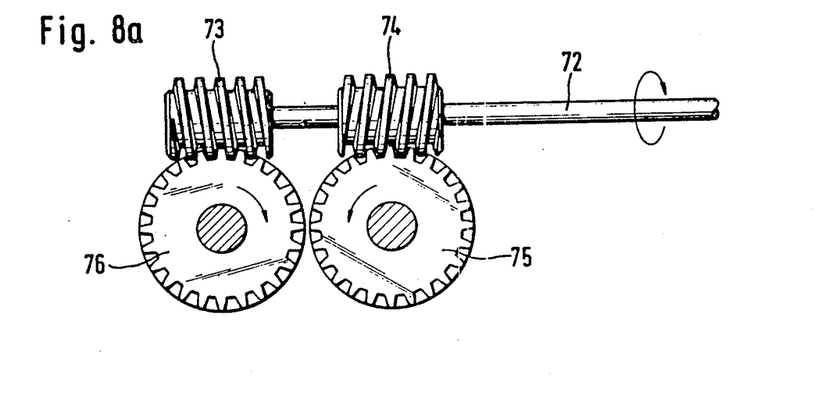
FIGS. 8a, b, c are different possibilities for the adjustment of the toothed wheels supporting the guide jaws or of the guide jaws themselves.
Figure 8B:
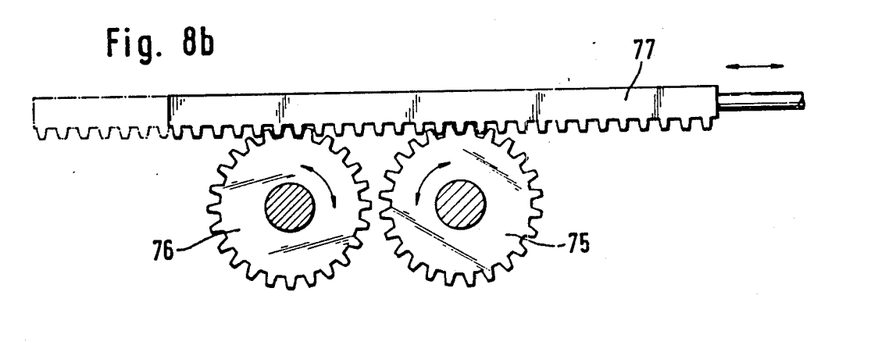
Figure 8C:
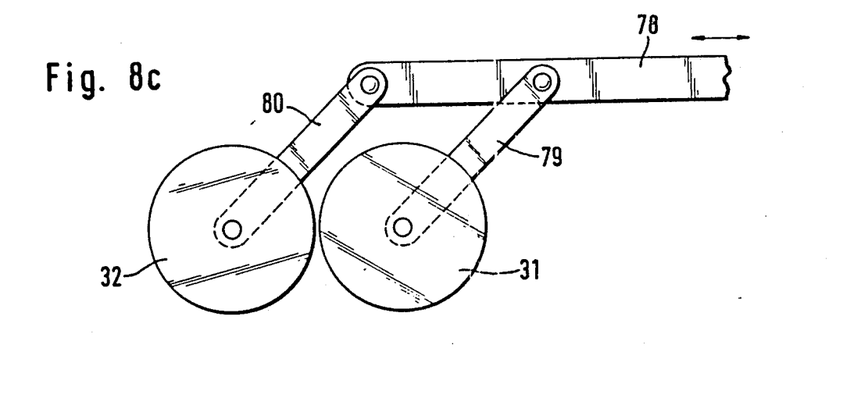

From FIG. 2, it is seen that driving of the two guide jaws 31, 32 takes place via toothed wheels 33, 34 which are in engagement with each other. However, other drive means are also possible, such as, for example, in accordance with FIG. 8a by means of a worm shaft 72 with two opposed worm drives 73, 74 driving toothed wheels 75, 76 on which the guide jaws (not shown in FIG. 2) are disposed. In FIG. 8b, driving of the two toothed wheels 75, 76 is via a toothed rack 77. Both toothed wheels turn in the same direction. This then requires that the grooves 60, 61 are formed so that they widen or narrow correspondingly in the same way so that they complement each other in the respective positions of the toothed rack 77 at the points according to FIGS. 4, 5, 7, where the guide jaws touch. The same is true for driving the guide jaws 31, 32 in accordance with FIG. 8c, which takes place via level bar formed by the pivot levers 79, 80 and the control rod 78.

Figure 9:
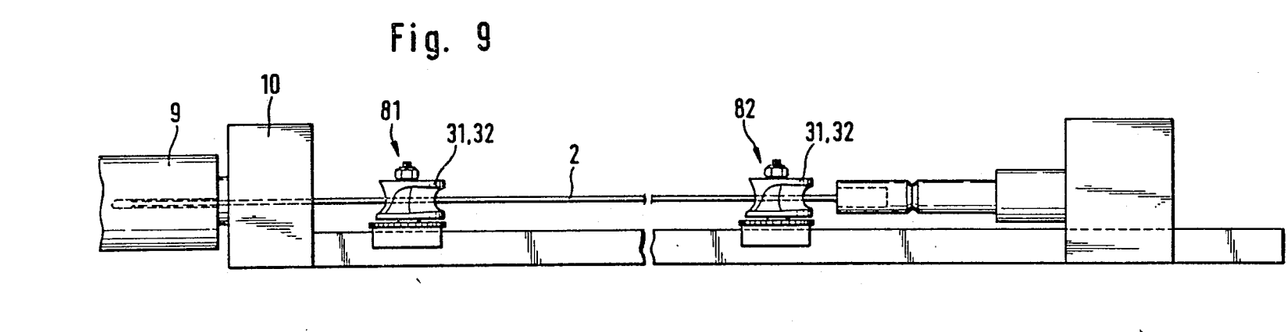
FIG. 9 illustrates two guide devices placed one behind the other.
Figure 10:
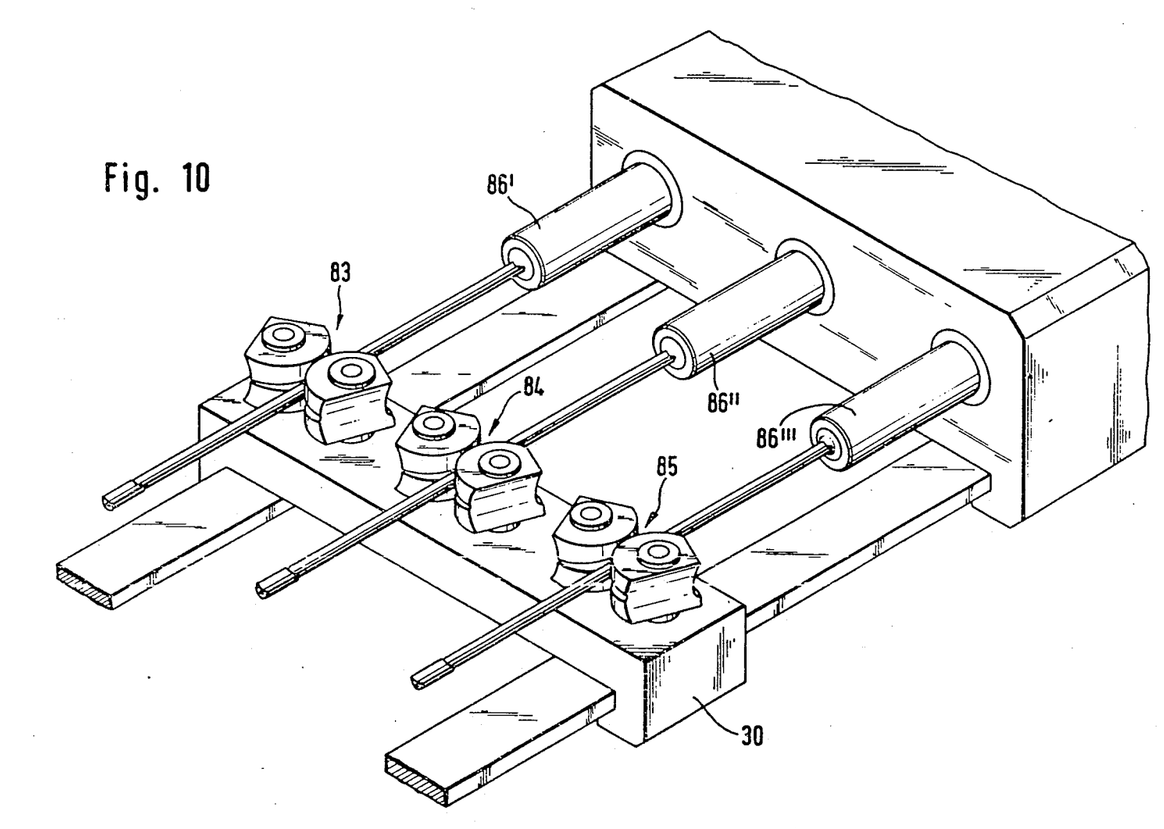
FIG. 10 illustrates the parallel placement of a plurality of guide devices.

FIG. 9 illustrates two guide units 81, 82 formed by guide jaws 31, 32 and disposed behind each other. This is required in case of very long tools. FIG. 10 schematically shows the side by side disposition of three guide units 83, 84, 85 in a deep drilling machine with three head spindles 86′, 86″, 86‴ disposed side by side. It may be provided that the guide units are separately adjustable so that deep drilling tools with different drill diameters can be used.

Figure 11:
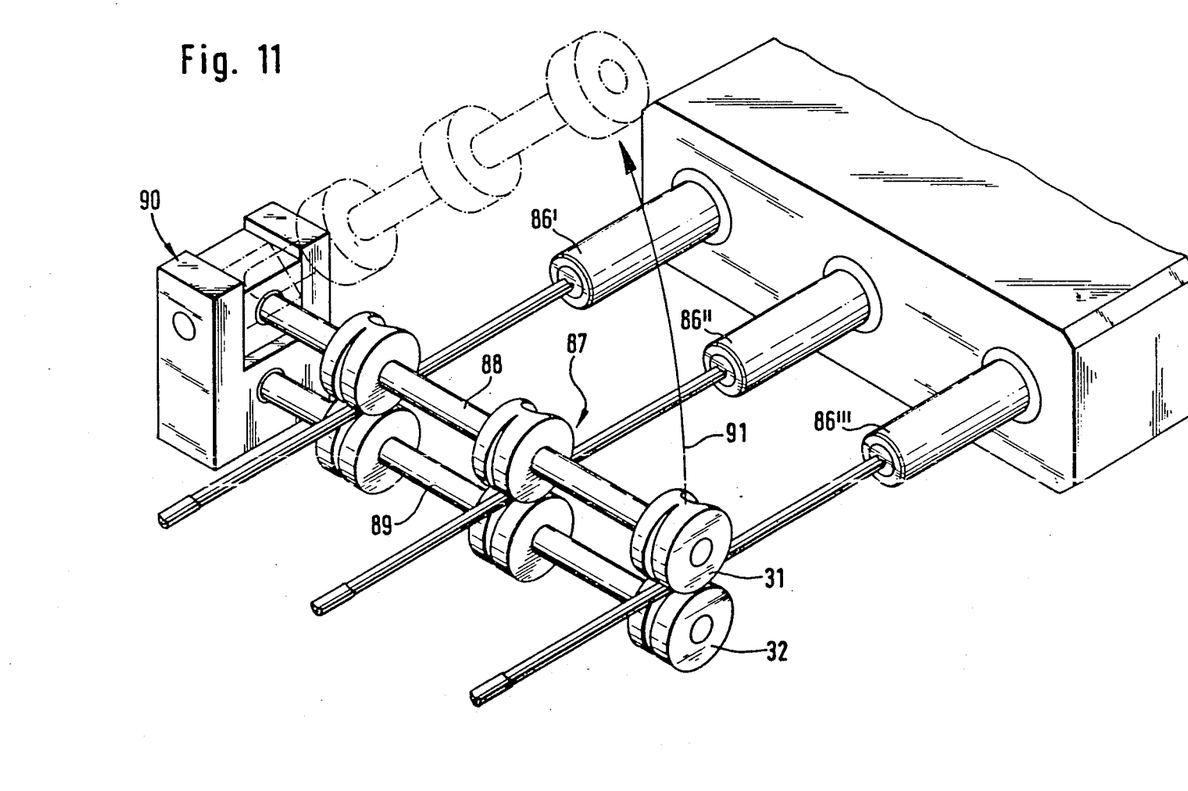
FIG. 11 illustrates the vertical arrangement of a plurality of guide devices.

FIG. 11 illustrates a vertical arrangement of the guide jaws 31, 32 in a guide unit 87. Such an arrangement is suitable for a multi-spindle arrangement and manual tool change. The guide jaws 31 are disposed on a common shaft 88, the guide jaws 32 on a common shaft 89. Both shafts 88, 89 are disposed in a control housing 90 such that they can be driven from there. This results in a paraticularly simple synchronous adjustability of the guide units. However, when changing the tools, the shafts 88 must be upwardly hingeable in the direction of the arrow 91.

Figure 12:
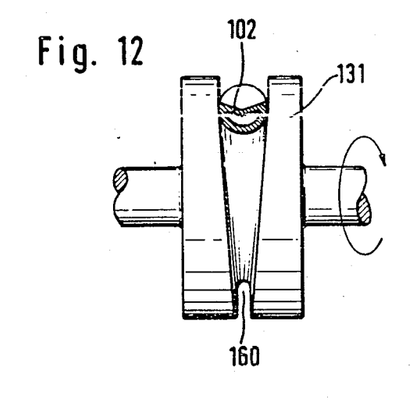
FIG. 12 schematically illustrates a further exemplary embodiment of the present invention.

FIG. 12 shows a simplified exemplary embodiment for less complicated demands on the guidance of a deep drilling tool. Guidance of the shaft 102 is accomplished by means of only one vertically arranged guide jaw 131 with a groove 160 which surrounds the shaft 102 only semicircularly, i.e. with a segment angle of 180°. With this, a continuous adjustment of the guide diameter is also possible.

What is claimed is:

1. A guide device for a deep drilling tool of a deep drilling machine, the tool comprising an elongated shaft and a drill head mounted at one end of the shaft, the guide device including at least one pivotably mounted guide jaw, the pivot axis of which is disposed perpendicularly to the longitudinal extent of the shaft, said guide jaw having an outer surface extending in the circumferential direction about the guide jaw, said outer surface having a groove defined by a semicircularly shaped surface, and said groove extending along at least a part of the circumferential extent of the outer surface, said semicircularly shaped surface having a diameter which varies along the circumferential extent of the outer surface, said semicircularly shaped surface serving as a guide surface for the shaft of the deep drilling tool.

2. The guide device as defined in claim 1, including a further guide jaw with an outer surface having a groove defined by a semicircularly shaped surface, wherein the two guide jaws are situated adjacent to each other such that their outer surfaces can be brought into abutting relationship, and wherein the guide surface of each guide jaw forms a guide opening for the shaft when the guide jaws abut, said guide opening having a diameter which varies in accordance with the varying diameter of its guide surfaces.

3. The guide device as defined in claim 2, wherein the machine includes a shaft clamping cylinder which clamps the other end of the shaft, and wherein the guide jaws together define, at a given pivotal position about their respective pivot axes, a further opening coaxial with the shaft through which the clamping cylinder can extend.

4. The device as defined in claim 3, wherein the further opening defines a circular cross section for at least a part of its opening, said further opening serving as a guide opening for the clamping cylinder.

5. The guide device as defined in claim 2, wherein the guide jaws together define, at a given pivotal position about their respective pivot axes, a recess opened at its top and closed at its bottom by damper or baffle segments, said recess serving to accept the drill head.

6. The guide device as defined in claim 2, wherein each guide jaw includes a toothed wheel which are in meshing engagement, one of said wheels being driven.

7. The guide device as defined in claim 1, wherein the guide jaw is made of plastic.

8. The guide device as defined in claim 7, wherein the guide jaw is made of polyoxymethylene.

9. The guide device as defined in claim 2, further including means for pivoting each guide jaw in common.

10. The guide device as defined in claim 2, including two further guide jaws situated adjacent to each other and separated from said adjacent further guide jaw and said at least one guide jaw along the longitudinal extent of the shaft.

11. The guide device as defined in claim 2, wherein each guide jaw is mounted on a shaft which defines the pivot axis of its respective guide jaw, one of said shafts being disposed to pivot relative to the other shaft.

12. The guide device as defined in claim 2, wherein at least one of the guide jaws is driven such that a specified adjustable torque is applied to the guide jaws in the pivotal direction which results in a decrease in the diameter of the guide opening, thereby producing a specific friction between the shaft and the semicircularly shaped surfaces defining the guide opening.

13. The guide device as defined in claim 2, wherein the machine includes at least two adjacent drilling tools, and the guide device includes at least one pivotally mounted guide jaw and a further guide jaw for each shaft.

14. The guide device as defined in claim 13, wherein the at least one pivotally mounted guide jaw and further guide jaw for each shaft form a unit, and wherein the units are situated adjacent to each other.

15. The guide device as defined in claim 14, wherein the guide jaws in each unit are mounted on a common shaft which defines the pivot axis of their respective guide jaws, and the further guide jaws in each unit are mounted on a common shaft which defines the pivot axis of their respective further guide jaws, and wherein one of the common shafts is disposed to pivot relative to the other of the common shafts.

* * * * *